United States Patent
Fennell et al.

(10) Patent No.: US 12,323,460 B2
(45) Date of Patent: Jun. 3, 2025

(54) TYPOSQUATTING DETECTION AND NOTIFICATION

(71) Applicant: Bank of America Corporation, Charlotte, NC (US)

(72) Inventors: Scott Fennell, Carrollton, TX (US); Jeffrey Texada, Carrollton, TX (US); Jennie Kathleen Egbert, Ventura, CA (US)

(73) Assignee: Bank of America Corporation, Charlotte, NC (US)

( * ) Notice: Subject to any disclaimer, the term of this patent is extended or adjusted under 35 U.S.C. 154(b) by 303 days.

(21) Appl. No.: 17/954,885

(22) Filed: Sep. 28, 2022

(65) Prior Publication Data

US 2024/0106857 A1    Mar. 28, 2024

(51) Int. Cl.
*H04L 9/40* (2022.01)
(52) U.S. Cl.
CPC ................... *H04L 63/1483* (2013.01)
(58) Field of Classification Search
CPC .................................................. H04L 63/1483
See application file for complete search history.

(56) References Cited

U.S. PATENT DOCUMENTS

| | | | |
|---|---|---|---|
| 6,223,284 B1 * | 4/2001 | Novoa | G06F 21/572 |
| | | | 709/216 |
| 8,285,830 B1 | 10/2012 | Stout et al. | |
| 8,510,411 B2 | 8/2013 | Coulson et al. | |
| 9,934,379 B2 | 4/2018 | Monrose et al. | |
| 10,419,477 B2 | 9/2019 | Desai et al. | |
| 10,491,614 B2 | 11/2019 | Grill et al. | |
| 10,785,188 B2 | 9/2020 | Nguyen et al. | |
| 2007/0016954 A1 * | 1/2007 | Choi | G06F 21/577 |
| | | | 726/25 |
| 2007/0112814 A1 * | 5/2007 | Cheshire | H04L 63/168 |
| | | | 707/E17.112 |
| 2012/0317467 A1 * | 12/2012 | Cahill | G06F 40/166 |
| | | | 715/205 |
| 2016/0127417 A1 * | 5/2016 | Janssen | H04L 63/1433 |
| | | | 726/1 |
| 2017/0149818 A1 * | 5/2017 | Hillis | H04L 63/1441 |
| 2018/0005198 A1 * | 1/2018 | Milman | H04L 67/04 |

(Continued)

FOREIGN PATENT DOCUMENTS

| | | | | |
|---|---|---|---|---|
| WO | WO-2007066862 A1 * | 6/2007 | | G06F 21/6263 |
| WO | WO-2016091088 A1 * | 6/2016 | | H04L 29/06 |

*Primary Examiner* — Christopher A Revak
(74) *Attorney, Agent, or Firm* — Banner & Witcoff, Ltd.

(57) ABSTRACT

Arrangements for providing typosquatting detection and notification functions are provided. In some aspects, user input data may be received. The user input may include a website or website address received via a web browser address bar displayed on a user computing device. The user input may be analyzed, using a machine learning model, to determine a likelihood of typosquatting. The determined likelihood may be compared to a threshold and, if the likelihood is below the threshold, the user may proceed with the request to access the website. If the likelihood meets or exceeds the threshold, a notification or user interface may be generated requesting user input confirming that the user input reflects a correct or desired website. User response data may be received and used to update and/or validate the machine learning model.

21 Claims, 14 Drawing Sheets

(56) References Cited

U.S. PATENT DOCUMENTS

| | | | |
|---|---|---|---|
| 2018/0097822 A1* | 4/2018 | Huang | G06N 20/00 |
| 2020/0287913 A1* | 9/2020 | Buck | H04L 63/14 |
| 2021/0097186 A1* | 4/2021 | Mandal | G06F 21/552 |
| 2021/0272031 A1* | 9/2021 | Brannon | G06F 21/552 |
| 2021/0287500 A1* | 9/2021 | Conlon | B60R 25/102 |
| 2021/0377303 A1* | 12/2021 | Bui | G06F 40/14 |
| 2022/0131877 A1* | 4/2022 | Oest | H04L 63/145 |
| 2023/0081299 A1* | 3/2023 | Myneni | G06N 20/00 726/23 |

* cited by examiner

TYPOSQUATTING DETECTION AND NOTIFICATION

BACKGROUND

Aspects of the disclosure relate to electrical computers, systems, and devices for providing typosquatting detection and notification in multi-computer systems.

Enterprise organizations can employ thousands or even tens of thousands of employees who may be using enterprise computing devices to access various websites in the course of business. However, users may make errors in entering a website address which may lead users to an undesired website. Unauthorized actors will often register these domains that are similar to safe or known domains that are frequently mis-typed. This process is known as typosquatting. If a user inadvertently views a website associated with a typosquatting domain, rather than a desired domain, the user may be subject to malware, ransomware, credential theft, and various other cybersecurity issues. Accordingly, it is advantageous to identify occurrences of typosquatting before the user accesses the website in order to avoid any malicious activity.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with detecting typosquatting and efficiently notifying users of potential typosquatting.

In some aspects, user input data may be received. The user input may include a domain or website address received via a web browser address bar displayed on a user computing device. The user input may be analyzed, using a machine learning model, to determine a likelihood of typosquatting. The determined likelihood may be compared to a threshold and, if the likelihood is below the threshold, the user may proceed with the request to access the website. If the likelihood meets or exceeds the threshold, a notification or user interface may be generated requesting user input confirming that the user input reflects a correct or desired website address or domain. User response data may be received and used to update and/or validate the machine learning model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, enterprise organizations often have thousands or tens of thousands of employees accessing various websites during the course of business. Users can sometimes mis-type a website address or domain into a browser address bar which can lead to visits to unintended sites. For instance, malicious actors may register domains that are similar to known or safe domains in a process known as typosquatting. The user may inadvertently access the typosquatting website instead of an intended website and that may lead to credential theft, malware risks, ransomware risks, and the like. Accordingly, arrangements described herein provide for real-time detection and notification of typosquatting domains to enable users to avoid malicious acts associated with unintended websites.

Accordingly, as discussed more fully herein, users may input or type a website address into a browser address bar of a web browser application executing on a user computing device. A machine learning model may analyze the user input to determine a likelihood that the user input is associated with typosquatting. For instance, if the website address matches a known, safe website address the model may output a low likelihood of typosquatting. However, if the user inputs data that does not match a safe, known website, the model may identify a greater likelihood of typosquatting. Accordingly, if the identified likelihood is sufficiently high, a notification or user interface may be generated and transmitted to the user requesting user input confirming accuracy of the user input. The user may select an option from the user interface and that response data may then be used to update or validate the machine learning model.

These and various other arrangements will be discussed more fully below.

Figure 1A:
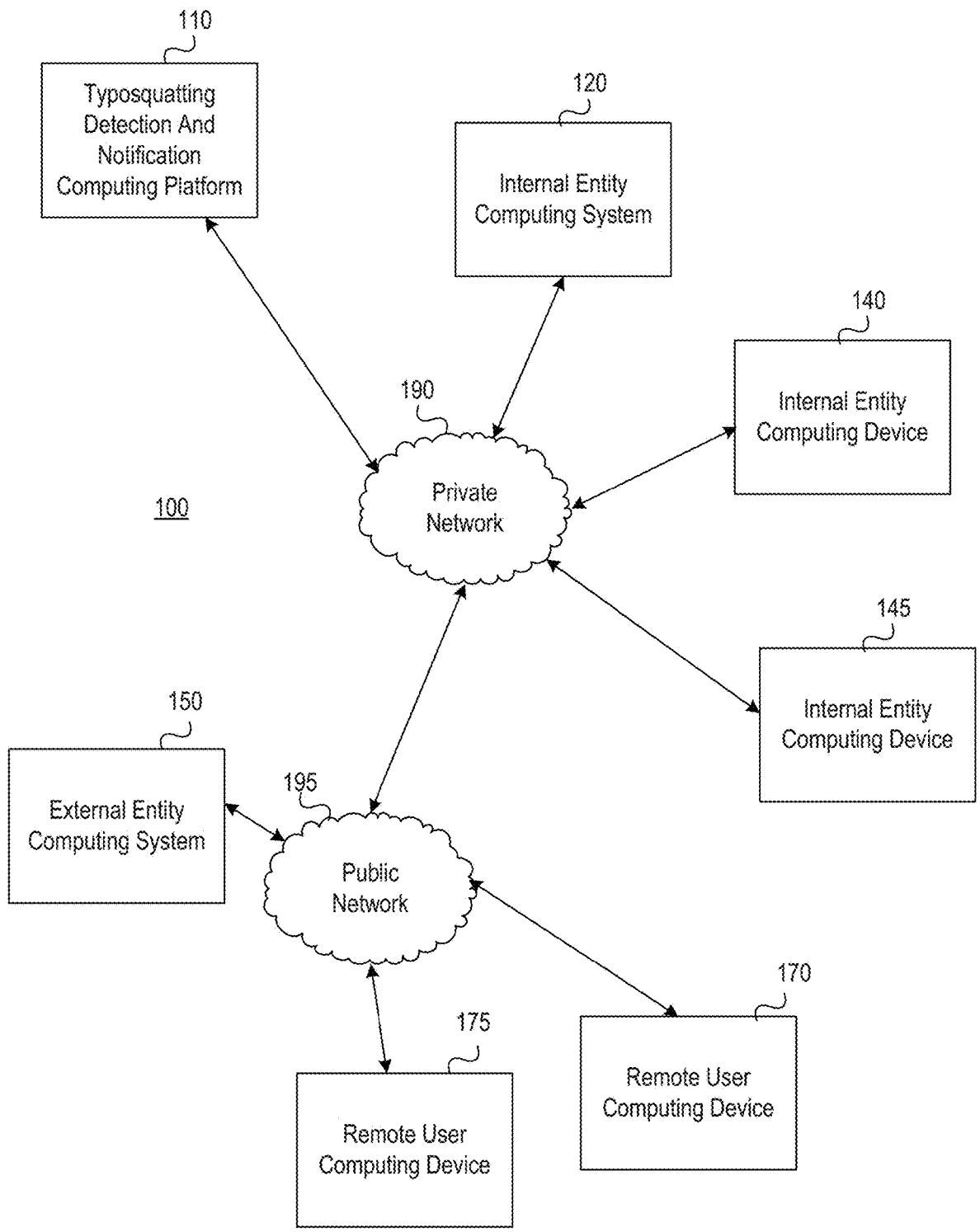
FIGS. 1A and 1B depict an illustrative computing environment for implementing typosquatting detection and notification functions in accordance with one or more aspects described herein.
Figure 1B:
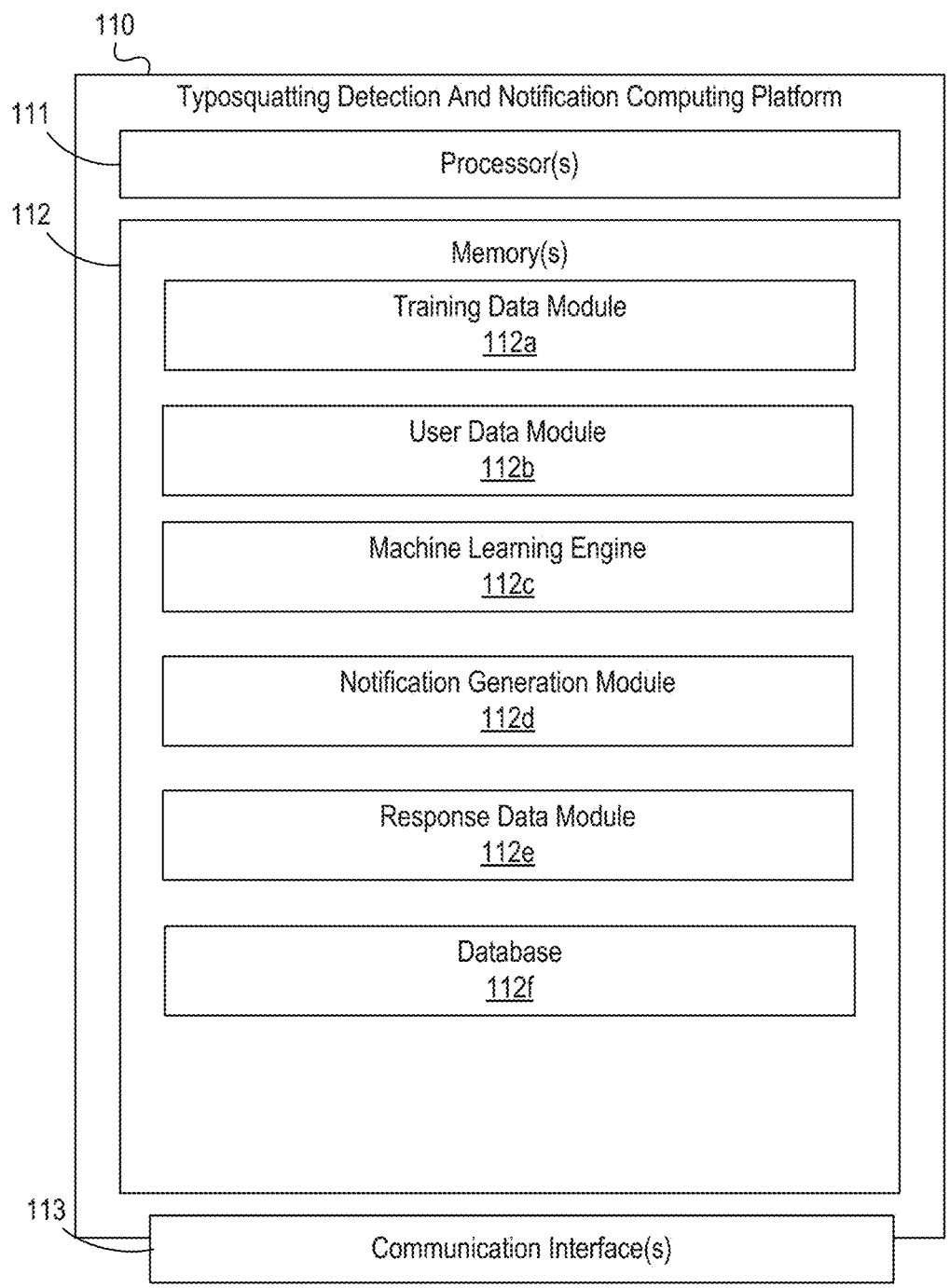

Aspects described herein may be implemented using one or more computing devices operating in a computing environment. For instance, FIGS. 1A-1B depict an illustrative computing environment for implementing typosquatting detection and notification functions in accordance with one or more aspects described herein. Referring to FIG. 1A, computing environment 100 may include one or more computing devices and/or other computing systems. For example, computing environment 100 may include typosquatting detection and notification computing platform 110, internal entity computing system 120, internal entity computing device 140, internal entity computing device 145, external entity computing system 150, remote user computing device 170 and/or remote user computing device 175. Although one internal entity computing systems 120, two internal entity computing devices 140, 145, one external entity computing system 150 and two remote user computing devices 170, 175 are shown, any number of systems or devices may be used without departing from the invention.

Typosquatting detection and notification computing platform 110 may be configured to perform intelligent, dynamic, and efficient typosquatting detection and notification. For instance, typosquatting detection and notification computing platform 110 may receive user input requesting access to a website. In some examples, the user input may be received in a web browser address bar. In some examples, the user input received in the address bar may be analyzed or evaluated in real-time or near real-time (e.g., as the user is typing in the address bar). Upon receiving the user input (e.g., website address, portion of a website address, or the like), typosquatting detection and notification computing platform 110 may analyze the input using, for instance, a machine learning model. In some examples, the machine learning model may be trained using vendor data identify safe websites or website addresses, unsafe or potentially malicious websites or website addresses, and the like. In some examples, historical user data may also be used to train the machine learning model. For instance, if a vast majority of users input a website address and a few users input a website address that is similar but not identical to the website address input by the vast majority of users, the machine learning model may detect a potential issue.

In some examples, the machine learning model may generate an output. For instance, the machine learning model may generate an output indicating a likelihood that the user input is associated with typosquatting. If the likelihood meets or exceeds a threshold, a user interface may be generated and automatically displayed on a user computing device from which the user input was received. In some examples, the user interface may cover a large portion of a user display (e.g., greater than 50%, greater than 75%, greater than 90% or the like). The user interface may indicate that the user input may be associated typosquatting domains and may request user response data to continue to the website associated with the user input or to proceed to another website (or not proceed). This response data may then be used to update and/or validate the machine learning model. Accordingly, in a next occurrence of user input requesting access to the website via the website address, the updated machine learning model may identify whether there is a likelihood of typosquatting using the updated or validated data based on user response data. In some examples, a notification may be generated and displayed indicating that the website or website address is blocked, or may request user input confirming the website or website address, similar to the first receipt of the user input. Accordingly, the machine learning model may continuously update and improve in accuracy.

The typosquatting detection and notification computing platform 110 may further evaluate user input as it is being input into an address bar. Accordingly, if user input matches a website or website address identified as safe, a first visual indicator may appear (e.g., a first color may be used to highlight the user input, a first hashing or pattern may be used to highlight the font, or the like). Additionally or alternatively, as the user input diverges from a known or safe website or website address, a second visual indicator may be used to identify a portion of the user input that is not associated with the safe or known website or website address (e.g., a second color or hashing pattern may be used to highlight the user input or the portion of the user input that is divergent from the safe website, or the like).

Internal entity computing system 120 may be or include one or more computing systems, devices, or the like, (e.g., servers, server blade, or the like) that may include one or more computing components (e.g., processor, memory, or the like) that may host or execute one or more applications of an enterprise organization. For instance, internal entity computing system 120 may host or execute one or more applications in use by an enterprise organization (e.g., internally during the course of business, externally to provide services to one or more customers, and the like), may include one or more proxy servers, may include historical web browsing data, may store one or more enterprise organization data security rules or policies, and the like. Accordingly, internal entity computing system 120 may capture browser data of a user that may be used to train the machine learning model, may capture proxy telemetry data that may be used to train the machine learning model, and the like. Internal entity computing system 120 may further store or execute one or more enterprise organization security policies (e.g., malware scanning policies or software, data associated with blocked websites, and the like). In some examples, internal entity computing system may store data associated with previously evaluated websites or website addresses, information about known phishing scams, and the like.

Internal entity computing device 140 and/or internal entity computing device 145 may be or include one or more computing devices (e.g., laptops, mobile devices, desktops, tablets, and the like) associated with one or more users internal to the enterprise organization (e.g., employees of the enterprise organization). Internal entity computing device 140 and/or internal entity computing device 145 may be used by the users in the course or business (e.g., to access applications and/or data, and the like). In some examples, users may input requests to access one or more websites via a web browser executing on internal entity computing device 140 and/or internal entity computing device 145.

External entity computing system 150 may be or include one or more computing devices or systems (e.g., servers, server blades, and the like) having one or more computer components (e.g., processor, memory, and the like) and may be associated with an entity external to or out outside of the enterprise organization. For instance, external entity computing system 150 may be associated with a vendor or service provider and, in some examples, may provide intelligence data or feeds to the enterprise organization. For instance, data related to safe and/or unsafe or potentially malicious websites or web addresses, known phishing scams, known malware attacks, and the like, may be provided to the enterprise organization from the vendor associated with external entity computing system 150.

Remote user computing device 170 and/or remote user computing device 175 may be or include one or more user computing devices (e.g., smart phones, wearable devices, laptops, desktops, tablets, or the like) that may be used (e.g., by an employee of the enterprise organization, or the like) to request access to one or more websites. For instance, a user associated with the enterprise organization may use their personal device to access one or more websites or web addresses (e.g., via enterprise organization systems) and may input user input requesting access in a web browser address bar via a display of the remote user computing device 170, 175. Remote user computing device 170, 175 may also receive user interfaces generated by typosquatting detection and notification computing platform 110 requesting user input confirming a requested website or web site address.

As mentioned above, computing environment 100 also may include one or more networks, which may interconnect one or more of typosquatting detection and notification computing platform 110, internal entity computing system 120, internal entity computing device 140, internal entity computing device 145, external entity computing system 150, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, typosquatting detection and notification computing platform 110, internal entity computing system 120, internal entity computing device 140, and/or internal entity computing device 145, may be associated with an enterprise organization (e.g., a financial institution), and private network 190 may be associated with and/or operated by the organization, and may include one or more networks (e.g., LANs, WANs, virtual private networks (VPNs), or the like) that interconnect typosquatting detection and notification computing platform 110, internal entity computing system 120, internal entity computing device 140, and/or internal entity computing device 145 and one or more other computing devices and/or computer systems that are used by, operated by, and/or otherwise associated with the organization. Public network 195 may connect private network 190 and/or one or more computing devices connected thereto (e.g., typosquatting detection and notification computing platform 110, internal entity computing system 120, internal entity computing device 140, and/or internal entity computing device 145) with one or more networks and/or computing devices that are not associated with the organization. For example, external entity computing system 150, remote user computing device 170 and/or remote user computing device 175, might not be associated with an organization that operates private network 190 (e.g., because external entity computing system 150, remote user computing device 170 and/or remote user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the Internet) that external entity computing system 150, remote user computing device 170 and/or remote user computing device 175 to private network 190 and/or one or more computing devices connected thereto (e.g., typosquatting detection and notification computing platform 110, internal entity computing system 120, internal entity computing device 140, and/or internal entity computing device 145).

Referring to FIG. 1B, typosquatting detection and notification computing platform 110 may include one or more processors 111, memory 112, and communication interface 113. A data bus may interconnect processor(s) 111, memory 112, and communication interface 113. Communication interface 113 may be a network interface configured to support communication between typosquatting detection and notification computing platform 110 and one or more networks (e.g., private network 190, public network 195, or the like). Memory 112 may include one or more program modules having instructions that when executed by processor(s) 111 cause typosquatting detection and notification computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of typosquatting detection and notification computing platform 110 and/or by different computing devices that may form and/or otherwise make up typosquatting detection and notification computing platform 110.

For example, memory 112 may have, store and/or include training data module 112a. Training data module 112a may store instructions and/or data that may cause or enable typosquatting detection and notification computing platform 110 to receive training data from one or more systems or devices (e.g., external entity computing system 150, internal entity computing system 120) and use the training data to train one or more machine learning models hosted or executed by machine learning engine 112c.

Typosquatting detection and notification computing platform 110 may further have, store and/or include user data module 112b. User data module 112b may store instructions and/or data that may cause or enable the typosquatting detection and notification computing platform 110 to receive user input data (e.g., user requests to access one or more websites or website addresses) from one or more user computing devices (e.g., internal entity computing device 140, internal entity computing device 145, remote user computing device 170, remote user computing device 175, or the like). The user input data may then be analyzed using, for instance, a machine learning model hosted or executed by machine learning engine 112c.

Typosquatting detection and notification computing platform 110 may further have, store and/or include machine learning engine 112c. Machine learning engine 112c may store instructions and/or data that may train, execute, update and/or validate one or more machine learning models which may, e.g., be used to identify or determine a likelihood of typosquatting. For instance, the machine learning model may be trained to identify patterns or sequences of data that may indicate a likelihood of typosquatting. In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Typosquatting detection and notification computing platform 110 may further have, store and/or include notification generation module 112d. Notification generation module 112*d* may store instructions and/or data that may cause or enable the typosquatting detection and notification computing platform 110 to generate, in response to an output from the machine learning model, one or more user interfaces that may be transmitted and displayed by a user computing device (e.g., internal entity computing device 140, 145, remote user computing device 170, 175, or the like). For instance, notification generation module 112*d* may generate a user interface identifying the website or website address input by the user and requesting user input confirming that the user would like to continue to access the website. In another example, notification generation module 112*d* may generate a user interface identifying the user input provided by the user and an alternative website or web address and may ask for user input selecting which website the user would like to access. Various other notifications may be generated without departing from the invention.

Typosquatting detection and notification computing platform 110 may further have, store and/or include response data module 112*e*. Response data module 112*e* may receive user input provided in response to one or more user interfaces generated by the notification generation module 112*d* and may update or validate the one or more machine learning models, may identify one or more enterprise organization entities that should be informed of the user access request, may generate one or more reports associated with an outcome of user action (e.g., if a user proceeded to the website whether the website contained malicious content, or the like), and the like.

Typosquatting detection and notification computing platform 110 may further include database 112*f*. The database 112*f* may store user input data, user response data, notification generation data, user action outcome data, and the like.

FIGS. 2A-2H depict one example illustrative event sequence for implementing typosquatting detection and notification functions in accordance with one or more aspects described herein. The events shown in the illustrative event sequence are merely one example sequence and additional events may be added, or events may be omitted, without departing from the invention. Further, one or more processes discussed with respect to FIGS. 2A-2H may be performed in real-time or near real-time.

Figure 2A:
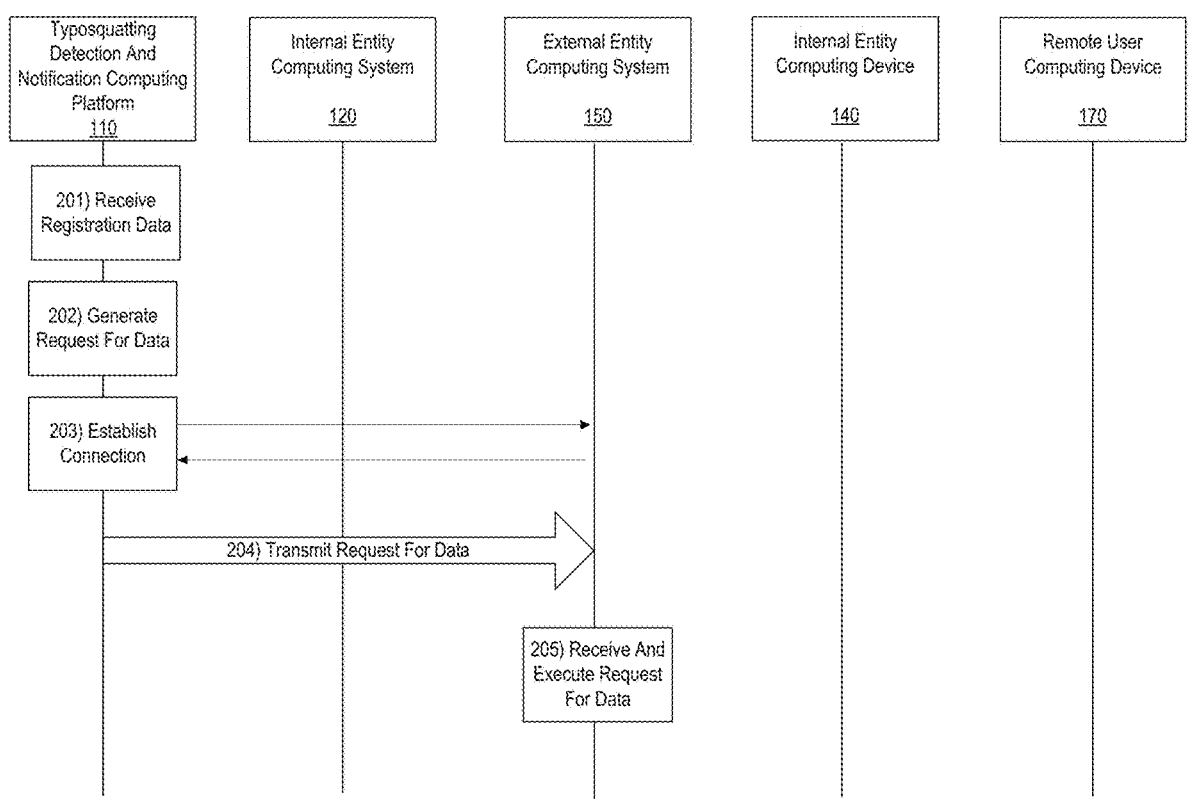
FIGS. 2A-2H depict an illustrative event sequence for implementing typosquatting detection and notification functions in accordance with one or more aspects described herein.

With reference to FIG. 2A, at step 201, typosquatting detection and notification computing platform 110 may receive registration data. For instance, one or more systems, devices, or the like, may be registered with the system to permit typosquatting detection. In some examples, all user devices associated with an enterprise organization (e.g., internal entity computing device 140, internal entity computing device 145, and the like) may be registered.

At step 202, typosquatting detection and notification computing platform 110 may generate a request for data. For instance, a request for machine learning model training data may be generated. In some examples, the request may include a request for vendor data (e.g., one or more intelligence feeds provided by an external entity), historical user browser data, and the like.

At step 203, typosquatting detection and notification computing platform 110 may connect to external entity computing system 150. For instance, a first wireless connection may be established between typosquatting detection and notification computing platform 110 and external entity computing system 150. Upon establishing the first wireless connection, a communication session may be initiated between typosquatting detection and notification computing platform 110 and external entity computing system 150. In some examples, typosquatting detection and notification computing platform 110 may determine that a connection already exists. If so, an additional connection might not be established.

At step 204, typosquatting detection and notification computing platform 110 may transmit or send the generated request for data to the external entity computing system 150. For instance, typosquatting detection and notification computing platform 110 may transmit or send the request for data during the communication session initiated upon establishing the first wireless connection.

At step 205, external entity computing system 150 may receive and execute the request for data. For instance, external entity computing system 150 may identify and extract the requested data to generate response data. For instance, one or more intelligence data feeds, or the like, may be used to generate response data. Although the arrangements include requesting external entity data to train the machine learning model, in some examples, external entity data may be continuously or periodically received and used to update or validate the machine learning model.

Figure 2B:
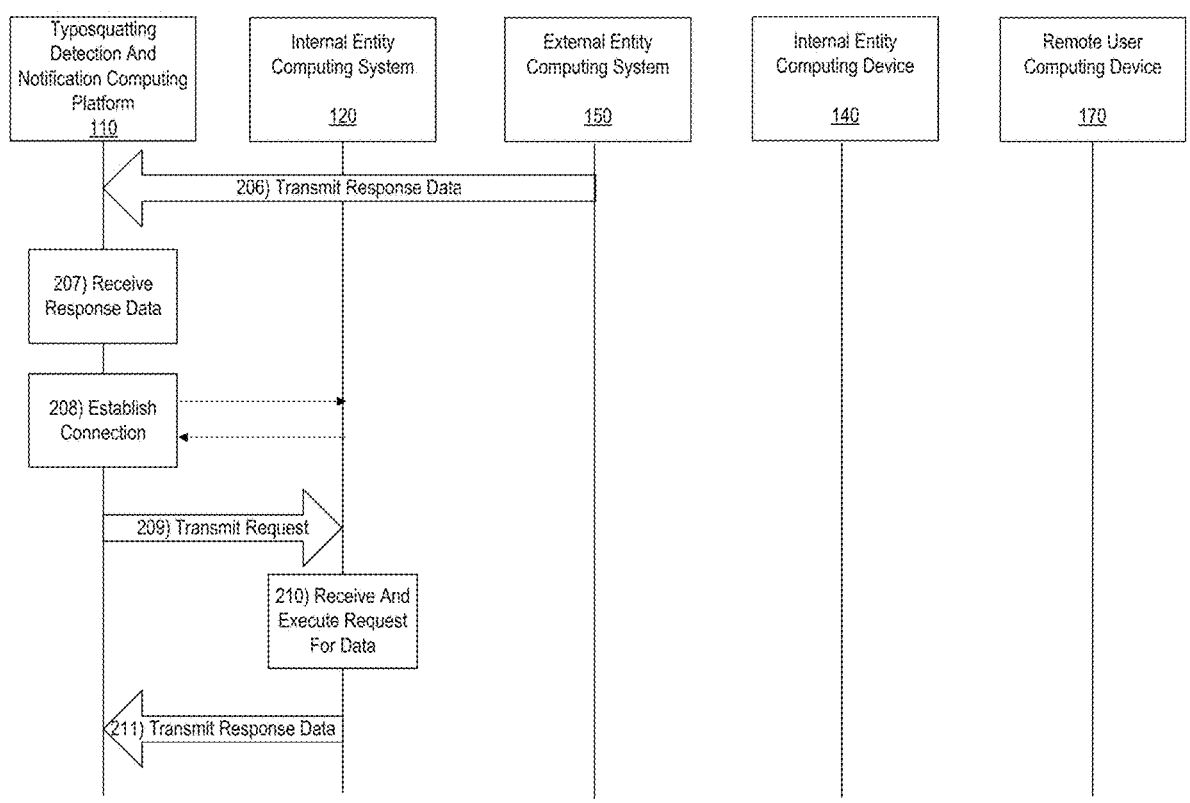

With reference to FIG. 2B, at step 206, external entity computing system 150 may transmit or send the response data to the typosquatting detection and notification computing platform 110.

At step 207, typosquatting detection and notification computing platform 110 may receive the response data.

At step 208, typosquatting detection and notification computing platform 110 may connect to internal entity computing system 120. For instance, a second wireless connection may be established between typosquatting detection and notification computing platform 110 and internal entity computing system 120. Upon establishing the second wireless connection, a communication session may be initiated between typosquatting detection and notification computing platform 110 and internal entity computing system 120. In some examples, typosquatting detection and notification computing platform 110 may determine that a connection already exists. If so, an additional connection might not be established.

At step 209, typosquatting detection and notification computing platform 110 may transmit or send the generated request for data to the internal entity computing system 120. For instance, typosquatting detection and notification computing platform 110 may transmit or send the request for data during the communication session initiated upon establishing the second wireless connection.

At step 210, internal entity computing system 120 may receive and execute the request for data. For instance, internal entity computing system 120 may identify and extract the requested data to generate response data.

At step 211, internal entity computing system 120 may transmit or send the response data to the typosquatting detection and notification computing platform 110.

Figure 2C:
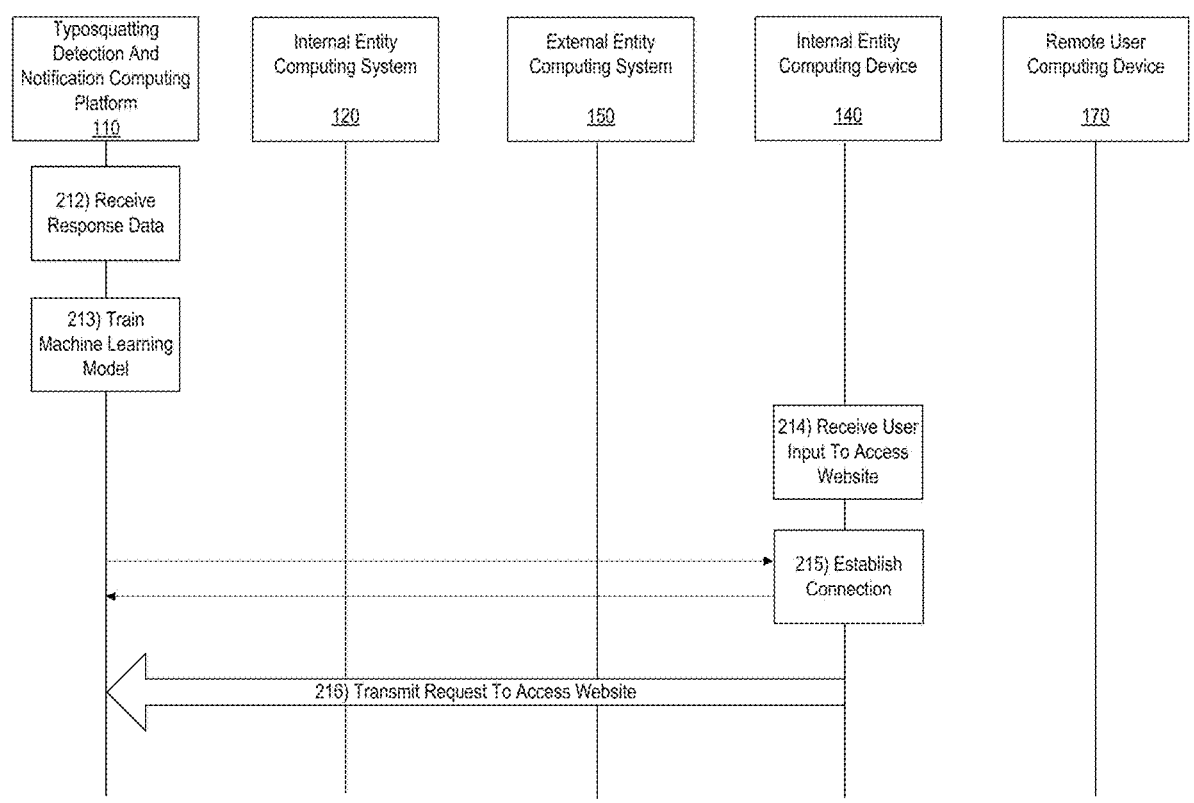

With reference to FIG. 2C, at step 212, typosquatting detection and notification computing platform 110 may receive the response data.

At step 213, typosquatting detection and notification computing platform 110 may train a machine learning model using, for instance, the response data received from the external entity computing system 150 and/or the internal entity computing system 120. For instance, typosquatting detection and notification computing platform 110 may train a model configured to input user data associated with requests to access one or more websites (e.g., input into a browser address bar, selection of a website from results of a search engine search, or the like), and identify, based on the user data input, a likelihood of typosquatting associated with the user input. To do so, typosquatting detection and notification computing platform 110 may input vendor data associated with known safe and malicious websites, historical browser data associated with one or more users within the enterprise organization, proxy telemetry data, issues identified with one or more websites previously accessed by users (e.g., websites that were accessed and included malicious content, websites that were accessed and included safe content, and the like) and/or other information.

Accordingly, the machine learning model may be trained to identify a likelihood of typosquatting associated with received user input (e.g., input received in real-time). In some instances, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing solutions, and/or other models.

At step 214, user input requesting access to a website may be received by, for instance, internal entity computing device 140. For instance, a user associated with the enterprise organization may type a website, portion of a website (e.g., begin typing a website or web address), or the like, into a web browser address bar, may select a website from search results provided via a search engine, or the like. This user input may initiate communication with typosquatting detection and notification computing platform 110.

For instance, at step 215, internal entity computing device 140 may connect to typosquatting detection and notification computing platform 110. For instance, a third wireless connection may be established between typosquatting detection and notification computing platform 110 and internal entity computing device 140. Upon establishing the third wireless connection, a communication session may be initiated between typosquatting detection and notification computing platform 110 and internal entity computing device 140. In some examples, internal entity computing device 140 may determine that a connection already exists. If so, an additional connection might not be established.

At step 216, the user input associated with the request to access the website (e.g., the website address or domain entered by the user, the website address of domain associated with the website selected from the search results, or the like) may be transmitted from the internal entity computing device 140 to the typosquatting detection and notification computing platform 110.

Figure 2D:
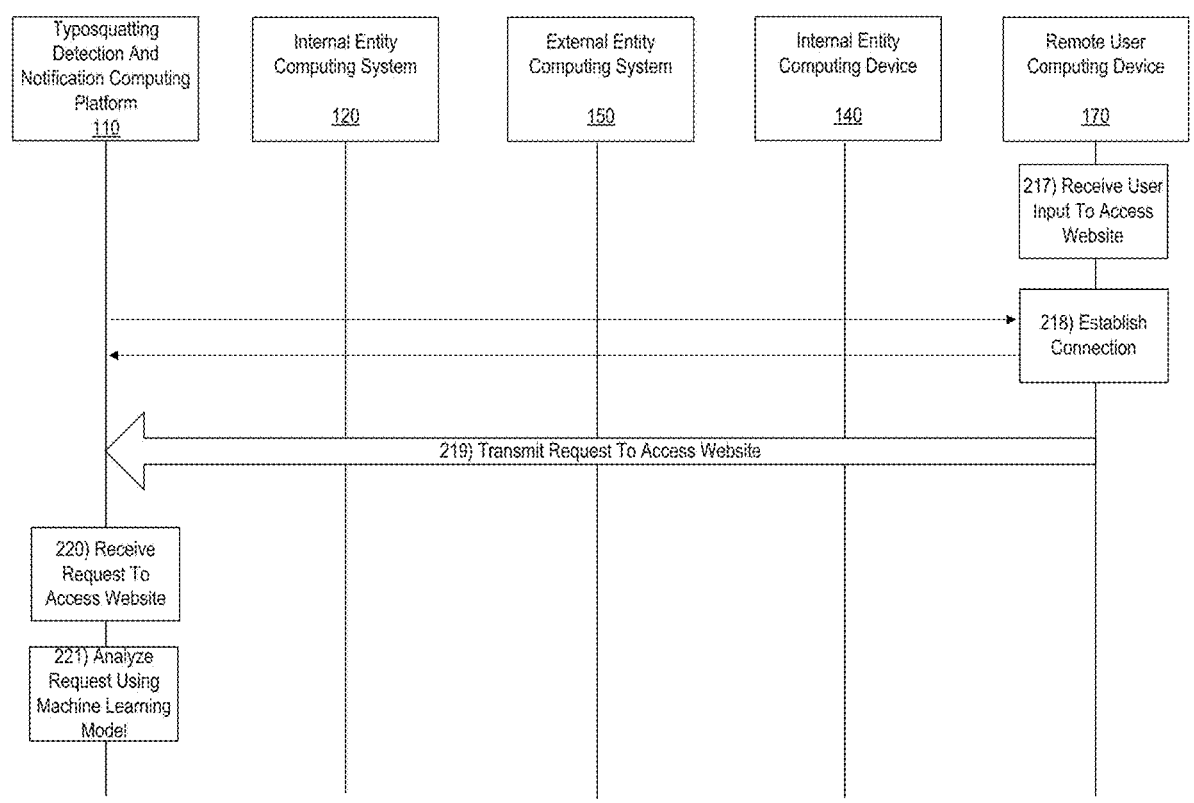

With reference to FIG. 2D, at step 217, user input requesting access to a website may be received by, for instance, remote user computing device 170. For instance, a user associated with the enterprise organization may type a website address or domain, portion of a website or domain (e.g., begin typing a website or web address), or the like, into a web browser address bar. This user input may initiate communication with typosquatting detection and notification computing platform 110.

For instance, at step 218, remote user computing device 170 may connect to typosquatting detection and notification computing platform 110. For instance, a fourth wireless connection may be established between typosquatting detection and notification computing platform 110 and remote user computing device 170. Upon establishing the fourth wireless connection, a communication session may be initiated between typosquatting detection and notification computing platform 110 and remote user computing device 170. In some examples, remote user computing device may determine that a connection already exists. If so, an additional connection might not be established.

At step 219, the user input associated with the request to access the website may be transmitted from the remote user computing device 170 to the typosquatting detection and notification computing platform 110.

At step 220, typosquatting detection and notification computing platform 110 may receive the request to access a website from internal entity computing device 140 and/or remote user computing device 170. In some examples, the user input may be received by typosquatting detection and notification computing platform 110 prior to being received by, for instance, a proxy server of the enterprise organization. Accordingly, analysis of potential typosquatting may be performed by the typosquatting detection and notification computing platform 110 prior to evaluation of the website address in view of enterprise organization cybersecurity policies. For instance, typosquatting detection and notification computing platform 110 may analyze the received user input for potential typosquatting prior to the proxy server receiving the request and determining whether the requested website is a safe website, a blocked website, or the like, based on enterprise organization policies.

Although the arrangements shown include user input requesting access to a website being received from both an internal entity computing device 140 and a remote user computing device 170, this is merely to illustrate that requests to access websites may be analyzed by this system regardless of the type of device being used to request the access. In some examples, a request may be received from a single device and processed. Further, multiple requests may be received from multiple types of devices and analyzed simultaneously or near simultaneously. Further, to simplify discussion, additional process performed may be described in the context of user input received from internal entity computing device 140 alone. However, this is merely for example and should not be viewed as limiting the invention.

At step 221, typosquatting detection and notification computing platform 110 may analyze the received user input requesting access to a website. For instance, the machine learning model may be executed using, as input, the website address or domain (or portion of a website address or domain) included in the user input requesting access. The machine learning model may identify patterns or sequences of data in the website address or portion of the website address to determine a likelihood of typosquatting associated with the received user input.

In some examples, analysis of the user input may be performed in real-time or near-real time. In some arrangements, the user input may be analyzed as the user is typing in the web browser address bar. Accordingly, the typosquatting detection and notification computing platform 110 may analyze the input as it is received and identify, using one or more visual indicators, whether the website or portion of the website is considered safe or potentially malicious.

Figure 3:
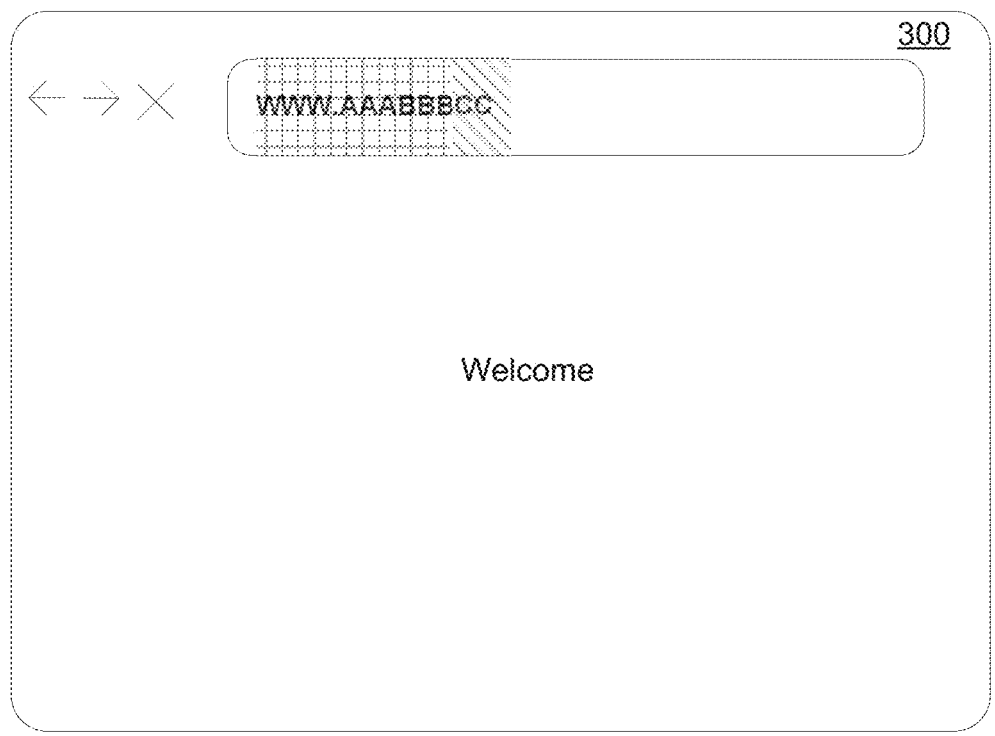
FIGS. 3-6 illustrate example user interfaces that may be generated in accordance with one or more aspects described herein.

For instance, FIG. 3 illustrates one example portion of a web browser 300 including an address bar. The user input or content provided in the address bar includes a website address associated with a website to which a user is requesting access. As shown in FIG. 3, a first visual indicator (e.g., a first type or pattern of hashing, a first color, or the like) may overlay the portion of the user input deemed safe or corresponding to a safe or expected website. However, as the user continues to type in the address bar, a second visual indicator (e.g., different type or pattern of hashing, a second color, or the like) may overlap the portion of the user input that may correspond to potential typosquatting. Accordingly, the user may be alerted to a potential issue based on the visual indicator.

Figure 2E:
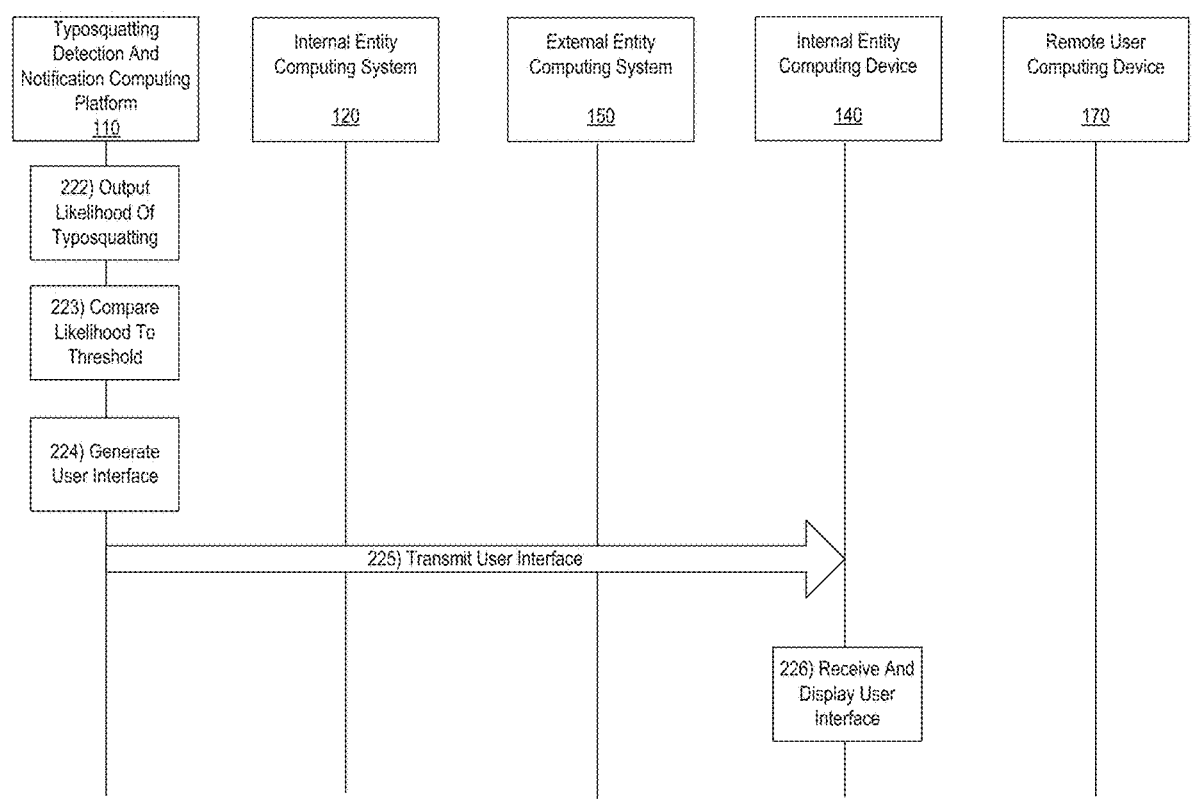

With reference to FIG. 2E, at step 222, the machine learning model may output the likelihood of typosquatting associated with the user input.

At step 223, the likelihood of typosquatting output by the machine learning model may be compared to one or more thresholds. For instance, an enterprise organization may determine a minimum threshold likelihood for which typosquatting is expected and, if the threshold is met or exceeded, a notification may be provided to the user. The notification may provide a "speed bump" in the user's request to access the website in that, before the request is evaluated by the proxy server of the enterprise organization, the user may be notified of the potential typosquatting and given an opportunity to proceed to the requested website, proceed to a different website, not proceed, and/or request further assistance.

Figure 4:
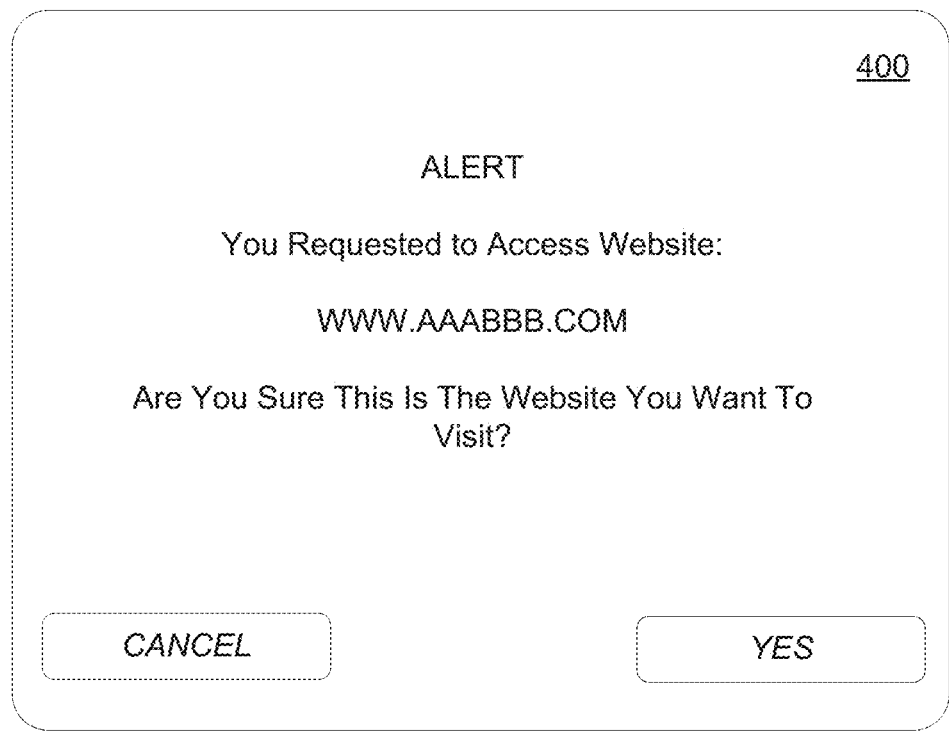

At step 224, if the likelihood of typosquatting is at or above the threshold, a notification may be generated by the typosquatting detection and notification computing platform 110. For instance, a notification or user interface identifying the website address or domain provided by the user and requesting user input as to whether the user would actually like to proceed to that website may be generated. FIG. 4 illustrates one example notification 400 that may be generated. The notification or user interface 400 includes identification of the website address input by the user and requests user input to confirm that this is the correct website. The user may select option "Yes" to proceed with the request to access that website or "Cancel" to request access to another website. Selection of "Yes" option may cause the request to be transmitted to the enterprise organization proxy server for analysis in view of enterprise cybersecurity policies before access may be provided.

Figure 5:

FIG. 5 illustrates another example notification or user interface 500 that may be generated. Interface 500 includes identification of the website address or domain input by the user, as well as a recommended alternative. The interface 500 may then include selectable options requesting the user to provide input to proceed to the recommended website ("Yes, Take Me To The Recommended Site"), proceed to the original website ("No, Proceed To Original Site"), or request assistance ("I'm Not Sure"). Selection of options to proceed to the recommended site or the original site may cause the request to be transmitted to the enterprise organization proxy server for analysis. Selection of the request for assistance may cause a request for review of the requested website (e.g., the original user input provided) to be transmitted to one or more administrators, analysts, or the like, for evaluation of whether the requested website is safe, potentially malicious, or the like. In some examples, the system may prevent the user from accessing the original website until the analysis of the site is completed. Alternatively, the user may be permitted to submit the request to access the original website (e.g., thereby transmitting the request to the proxy server for analysis under enterprise policies) while the review is occurring.

With further reference to FIG. 2E, at step 225, the generated notification or user interface may be transmitted by the typosquatting detection and notification computing platform 110 to the internal entity computing device 140. In examples in which the user input was received from remote user computing device 170, the notification or user interface may be transmitted to remote user computing device 170.

In some examples, transmitting the notification or user interface to the internal entity computing device 140 may cause the notification or user interface to be displayed on a display of the internal entity computing device 140. Accordingly, at step 226, internal entity computing device 140 may receive and display the notification or user interface. In some examples, the notification or user interface may overlay a significant portion of the display of the user, window associated with the web browser of the user, or the like (e.g., similar to a splash page). For instance, the notification or user interface may overlay at least, for example, 50%, 70%, 90%, or the like, of the display of the device, browser window, or the like.

Figure 2F:
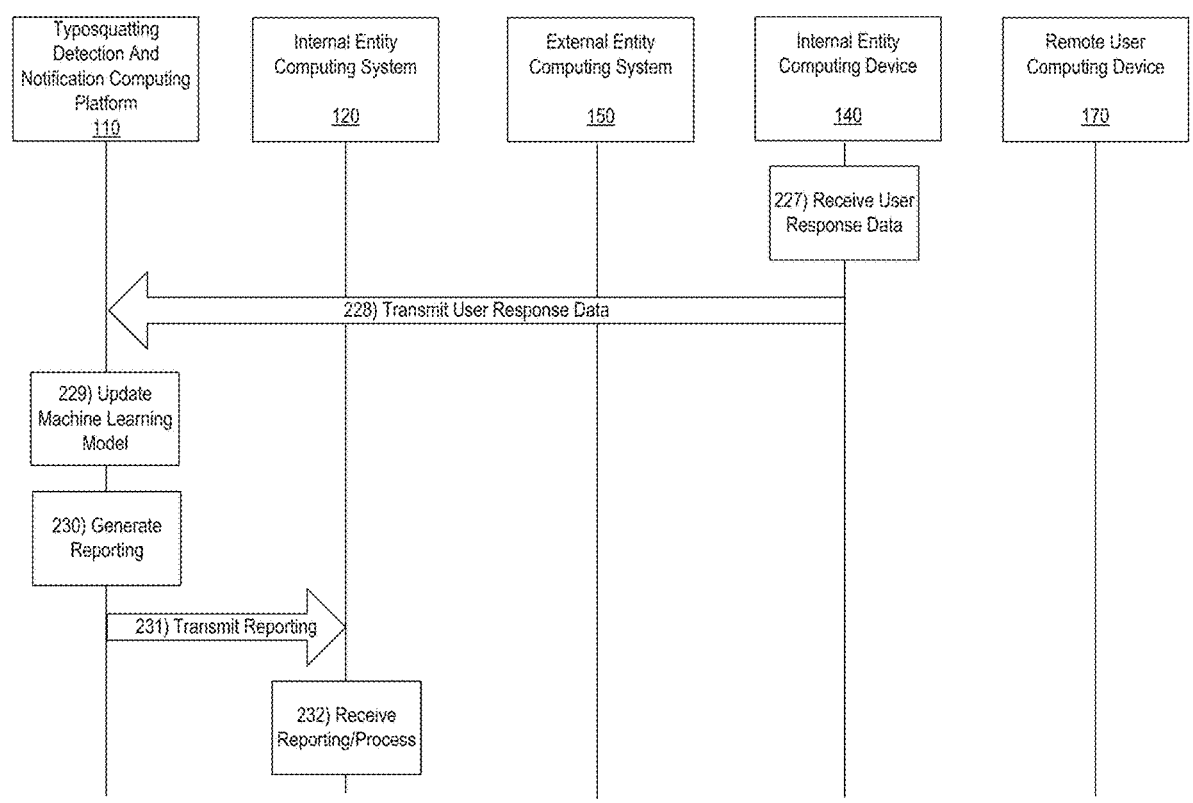

With reference to FIG. 2F, at step 227, internal entity computing device 140 may receive user response data. For instance, user input selecting an option from the displayed user interface or notification may be received by internal entity computing device 140.

At step 228, the internal entity computing device 140 may transmit or send the user response data to the typo squatting detection and notification computing platform 110.

At step 229, typosquatting detection and notification computing platform 110 may update and/or validate the machine learning model based on the user response data. For instance, the user response data may be used to update or validate the machine learning model to enable the model to "learn" from user actions and continuously improve accuracy in identifying potential typosquatting.

At step 230, typosquatting detection and notification computing platform 110 may generate one or more reports associated with the typosquatting analysis. For instance, reports related to user actions (e.g., how often users proceeded to original websites vs. recommended websites), whether sites accessed were malicious, whether additional investigation or action should occur (e.g., if a user proceeded to a site that was malicious, the user's device may be recommended for malware scanning or other cybersecurity actions to ensure device integrity).

At step 231, typosquatting detection and notification computing platform 110 may transmit the reports to one or more devices or systems, such as internal entity computing system 120. At step 232, internal entity computing system 120 may receive and process the reports and/or data. For instance, internal entity computing system 120 may further transmit reports to user devices, may process data from the reports, may initiate one or more actions (e.g., targeted training for users based on user actions, evaluation of user device, or the like) and the like.

Figure 2G:
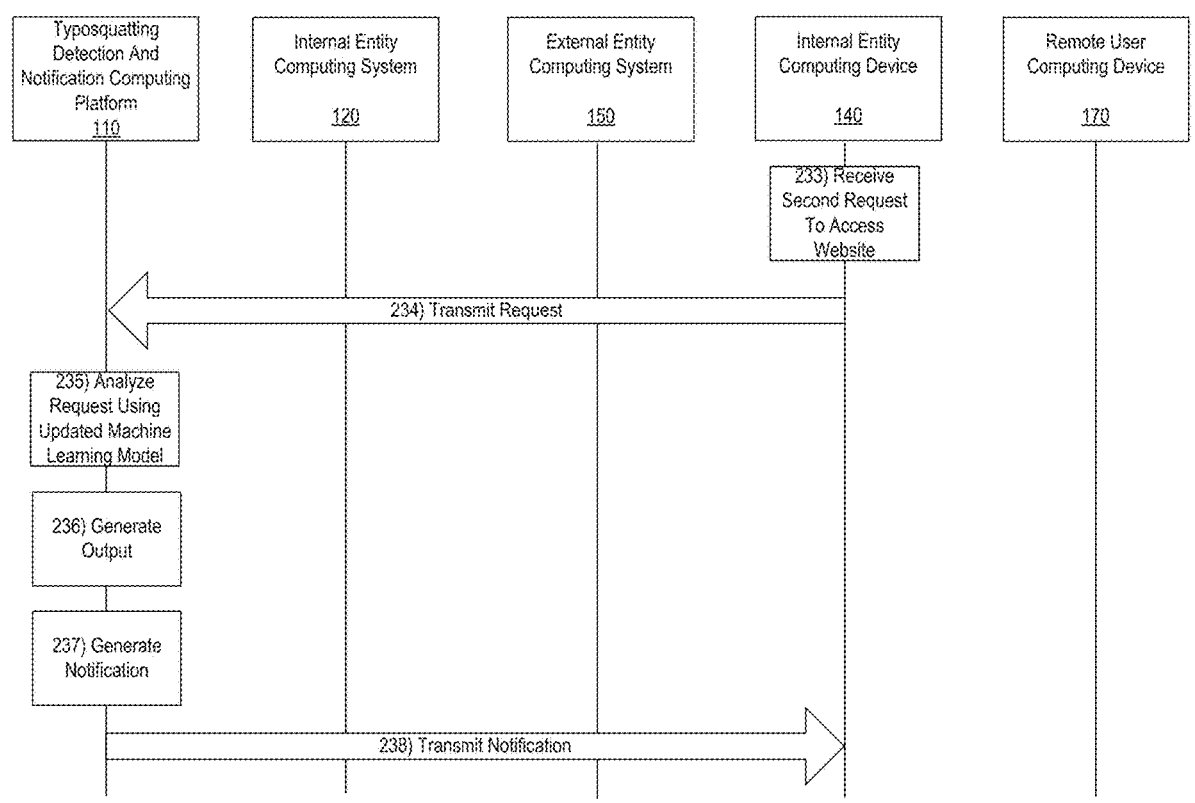

With reference to FIG. 2G, at step 233, internal entity computing device 140 may receive a second request to access the website. For instance, at a time after the first request to access the website, a user may request to access the same website.

At step 234, the second request, including the user input associated with the requested website, may be transmitted to typosquatting detection and notification computing platform 110. At step 235, the second request may be received by typosquatting detection and notification computing platform 110 and may be analyzed using, for instance, the updated or validated machine learning model (e.g., the updated model updated or validated based on user response data from an earlier request for access to the website).

At step 236, the updated machine learning model may generate an output. For instance, the updated machine learning model may generate a likelihood of typosquatting that may be compared to the threshold to determine if it is above the threshold for notification. Additionally or alternatively, the machine learning model may generate an output indicating that the website is typosquatting (e.g., based on captured user data, vendor data, user response data, or the like used in tuning the model) and may transmit an instruction to block or indicate access is not permitted to the website.

Figure 6:
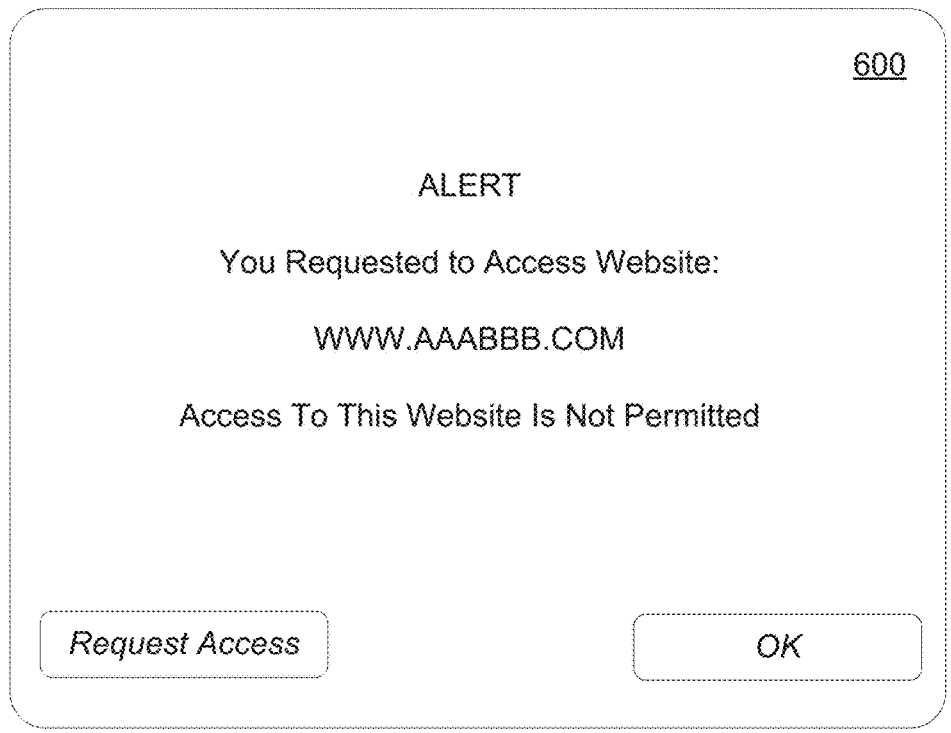

At step 237, typosquatting detection and notification computing platform 110 may generate a second notification. For instance, the notification may be similar to notification 400 in FIG. 4, notification 500 in FIG. 5, or may indicate that the website has been blocked or has been identified as typosquatting and access may not be permitted. For instance, FIG. 6 includes another example notification or user interface 600 indicating that the website is identified as typosquatting and that access is not permitted. The notification may include an option to request access which may prompt a request to be transmitted to one or more analysts who may review the website, confirm security of the website, and the like, and provide a response to the user. Various other notifications or user interfaces may be generated without departing from the invention.

At step 238, typosquatting detection and notification computing platform 110 may transmit or send the generated second notification to the internal entity computing device 140. In some examples, transmitting or sending the second notification may cause the internal entity computing device 140 to display the second notification on a display of the internal entity computing device 140.

Figure 2H:
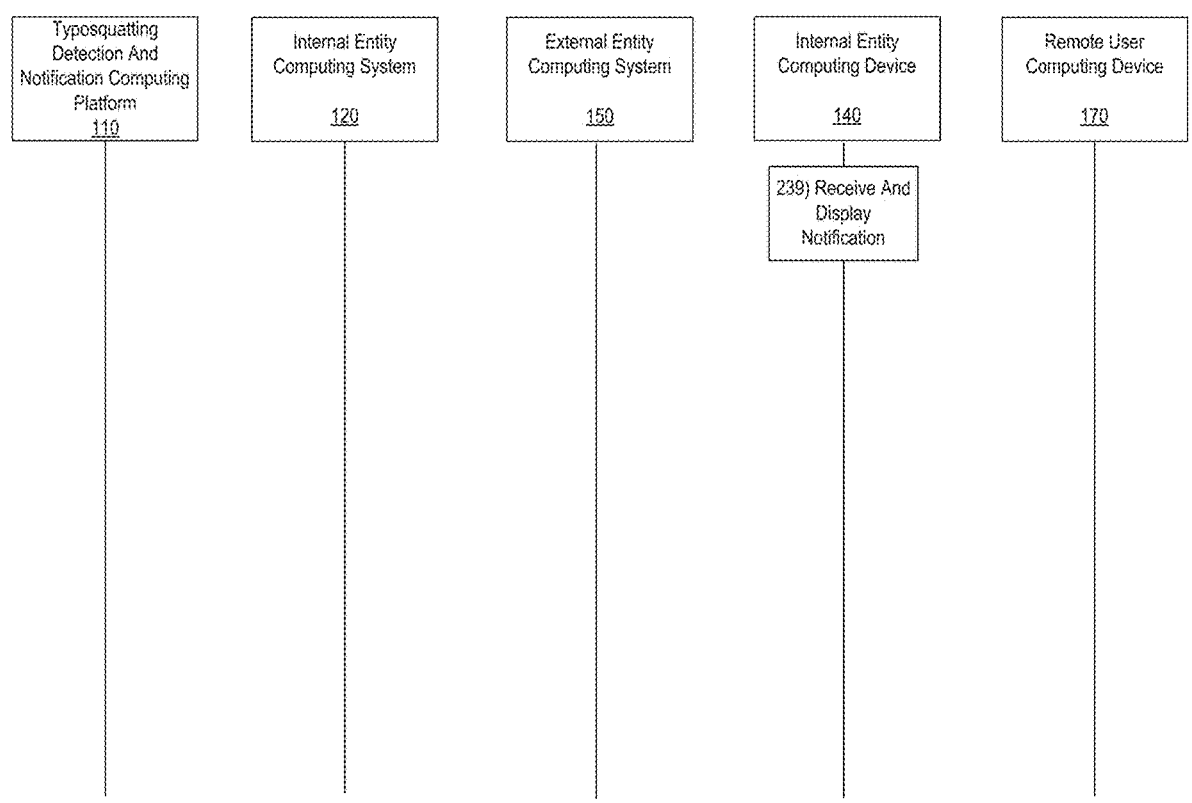

With reference to FIG. 2H, at step 239, internal entity computing device 140 may receive and display the second notification. Similar to other notifications, the notification may be sufficiently large to overlay a portion (e.g., 50%, 75%, 100%, or the like) of the display, browser window, or the like, to ensure the user is aware of the notification.

Figure 7:
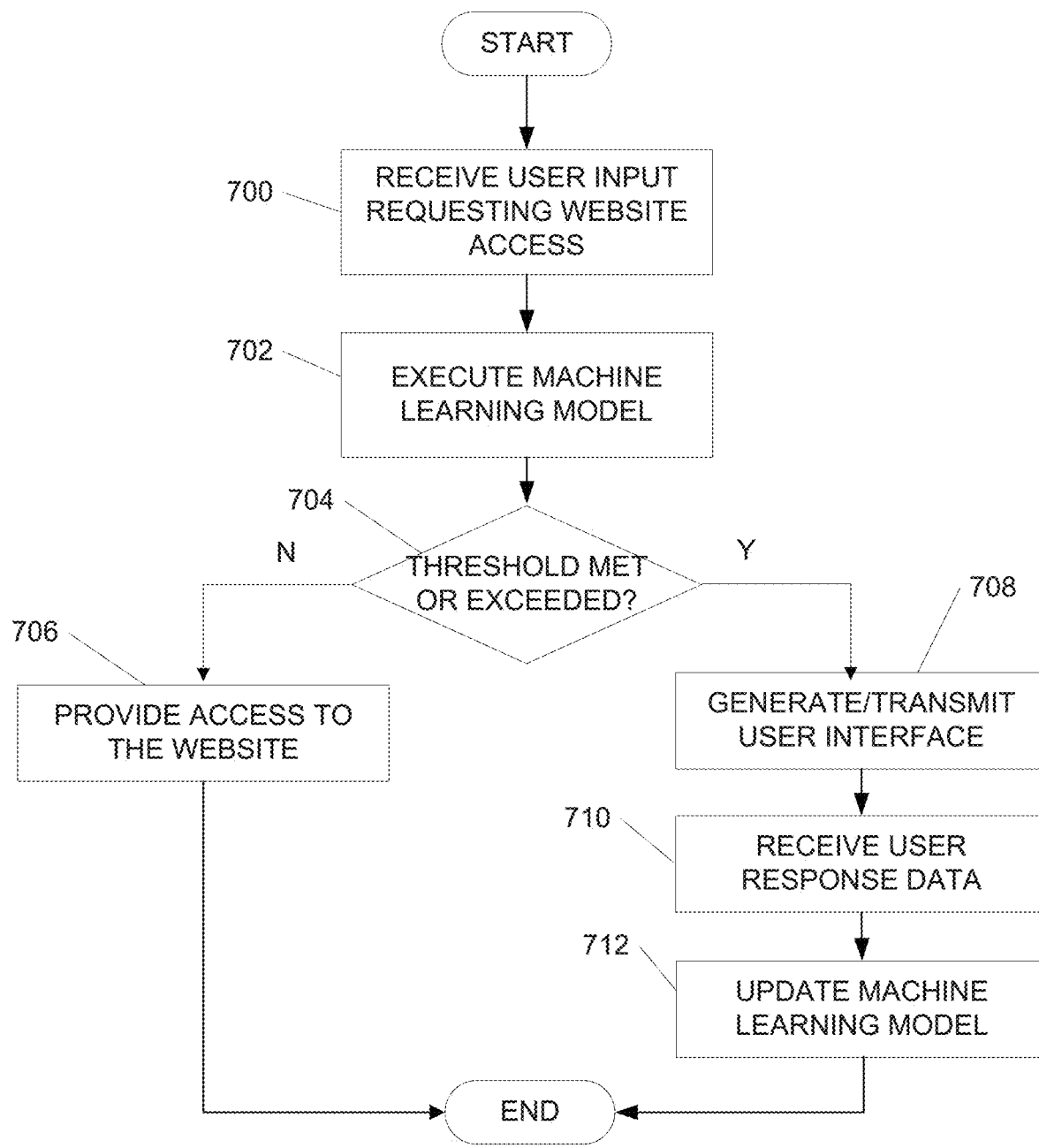
FIG. 7 illustrates an illustrative method for implementing typosquatting detection and notification functions according to one or more aspects described herein.

FIG. 7 is a flow chart illustrating one example method of implementing typosquatting detection and notification functions in accordance with one or more aspects described herein. The processes illustrated in FIG. 7 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 7 may be performed in real-time or near real-time.

At step 700, user input may be received from a user computing device, such as internal entity computing device 140, internal entity computing device 145, remote user computing device 170, remote user computing device 175, or the like. In some examples, the user input may include a request to access a website via a web browser executing on the user computing device. In some arrangements, the user input may include a website address of the website.

At step 702, the received user input may be analyzed. For instance, a machine learning model may be executed. The user input may be used as inputs in the machine learning model and the machine learning model may output a likelihood of typosquatting in the user input.

At step 704, the likelihood of typosquatting may be compared to a threshold and a determination may be made as to whether the likelihood meets or exceeds the threshold. If not, the system may permit the user to access the requested website at step 706. In some examples, permitting the user to access the requested website may include transmitting the request to access the website to a proxy server to evaluate the website or website address based on enterprise organization security policies. Accordingly, the arrangements described herein may permit the access to the website but a proxy server may evaluate the request downstream and determine that the website is blocked or access is not permitted.

If, at step 704, the likelihood of typosquatting meets or exceeds the threshold, at step 708, a user interface may be generated and transmitted to the user computing device. Transmitting the user interface may include causing the user interface to display on a display of the user computing device. The user interface may include identification of the user input identifying the website address and requesting user input confirming whether the user would like to continue to that website address, requesting input confirming whether the user meant to request access to a different website at a different website address, or the like.

At step 710, user response data may be received. For instance, a user may select one or more selectable options from the user interface and the response data may be received by the system.

At step 712, the user response data may be used to update and/or validate the machine learning model. In some examples, after updating the machine learning model, subsequent requests to access the website may be evaluated using the updated machine learning model which, in some examples, may generate an output indicating that access to that website is prevented (e.g., based on previous typosquatting occurrences).

Accordingly, arrangements provided herein enable real-time or near real-time evaluation of requests to access websites to determine whether the domain input is associated with typosquatting. By using a machine learning model that is continuously updated or validated based on user activity data, vendor data, and the like, the system may learn user's patterns of use, which may improve the accuracy of predictions of potential typosquatting. In some examples, the machine learning model may evaluate a user's input in view of previous patterns of user input to identify potential typosquatting.

Further, while conventional systems may not receive identification of typosquatting incidents in an immediate fashion, identifying typosquatting domains in conventional systems can take days or even weeks, during which users may be vulnerability to cyber attacks via the typosquatting websites. Accordingly, arrangements described herein not only inform the user of potential typosquatting, but also info system administrators, analysts, and the like, who may further investigate the domains, add domains to blocked lists of domains, evaluate a user machine for potential malware or ransomware, and the like.

In addition, aspects may be used to identify potential training opportunities for users and generate targeted training modules for various users.

Further, unlike conventional systems which merely block or permit access to a requested website, arrangements described herein provide a "speed bump" which slows the user, provides an indication of potential typosquatting and let's the user decide whether to proceed or not.

In some web browsers, cached data may be used to auto-populate a website address in a browser address bar. The arrangements described herein may aid in preventing users from continuously returning to a potentially malicious website due to errors in user input or typing by notifying a user of potential typosquatting, of blocked access, or the like.

Further, the arrangements described herein may also identify potential typosquatting even in view of website recommendations provided by a browser. By analyzing each entry into a web address bar, the system may identify likely typosquatting even if the website address is auto-populated by the web browser.

For instance, some malicious actors may set up watering holes that entice a user to access those websites (e.g., the malicious actors register a domain very similar to a legitimate domain associate with, for instance, a conference). The malicious actors may build recognition of the typosquatting site such that search engine results direct users to the typosquatting site rather than the expected website. This can leave users vulnerable to cyber-attacks. Accordingly, arrangements described herein would identify the likely typosquatting, even in instances where the user is selecting the website from search results generated by a search engine and can mitigate harm to the user or user device.

In some examples, the arrangements described herein may also provide insight into confidence of vendor intelligence data. For instance, based on user input data, typosquatting notification data, and the like, the system may identify vendor feeds that are less reliable.

Accordingly, the arrangements described herein provide real-time, efficient identification or detection of potential typosquatting, while providing valuable insights to users and system administrators related to user actions.

Figure 8:
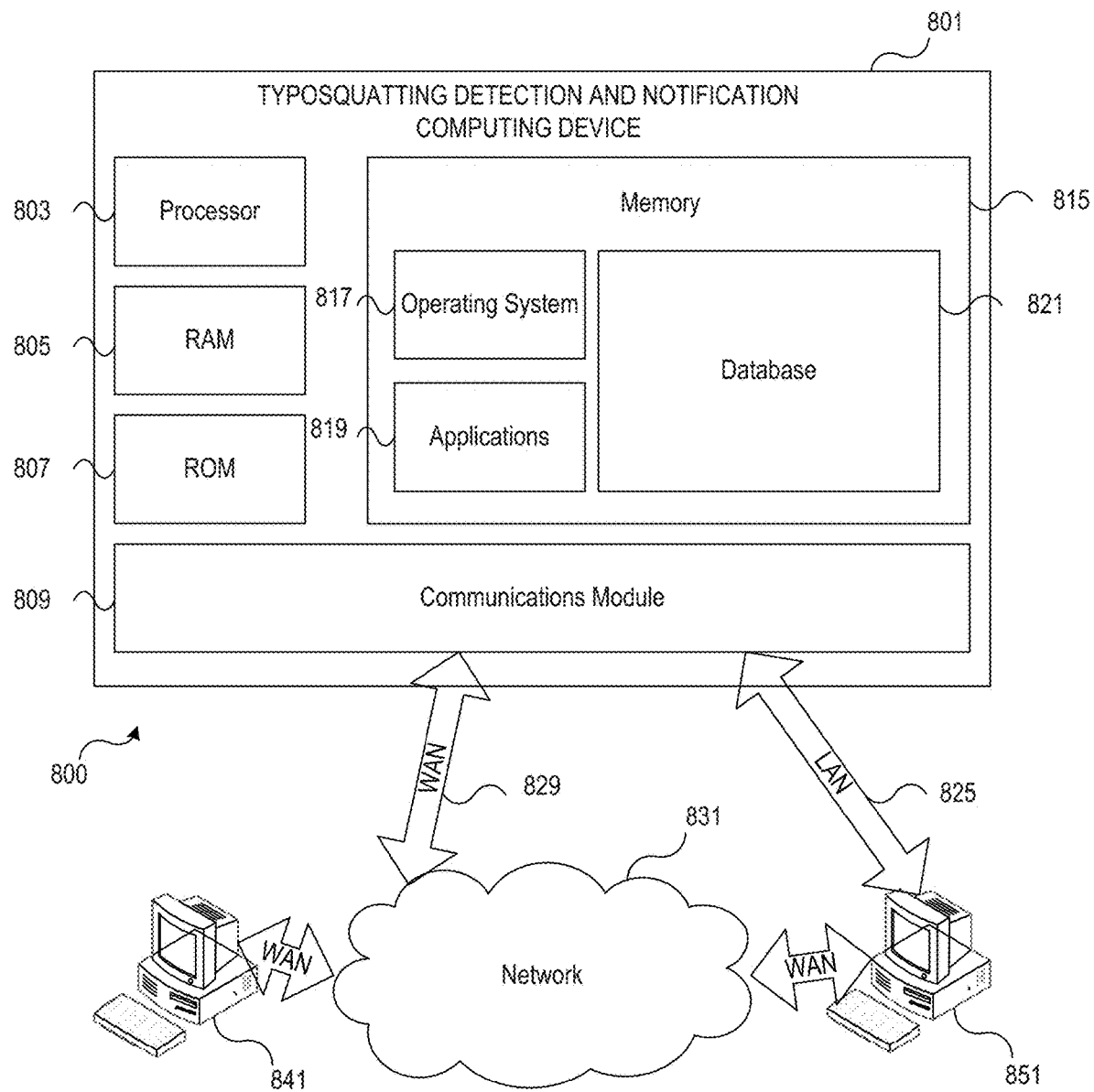
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include typosquatting detection and notification computing device 801 having processor 803 for controlling overall operation of typosquatting detection and notification computing device 801 and its associated components, including Random Access Memory (RAM) 805, Read-Only Memory (ROM) 807, communications module 809, and memory 815. Typosquatting detection and notification computing device 801 may include a variety of computer readable media. Computer readable media may be any available media that may be accessed by typosquatting detection and notification computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by typosquatting detection and notification computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on typosquatting detection and notification computing device 801. Such a processor may execute computer-executable instructions stored on a computer-readable medium.

Software may be stored within memory 815 and/or storage to provide instructions to processor 803 for enabling typosquatting detection and notification computing device 801 to perform various functions as discussed herein. For example, memory 815 may store software used by typosquatting detection and notification computing device 801, such as operating system 817, application programs 819, and associated database 821. Also, some or all of the computer executable instructions for typosquatting detection and notification computing device 801 may be embodied in hardware or firmware. Although not shown, RAM 805 may include one or more applications representing the application data stored in RAM 805 while typosquatting detection and notification computing device 801 is on and corresponding software applications (e.g., software tasks) are running on typosquatting detection and notification computing device 801.

Communications module 809 may include a microphone, keypad, touch screen, and/or stylus through which a user of typosquatting detection and notification computing device 801 may provide input, and may also include one or more of a speaker for providing audio output and a video display device for providing textual, audiovisual and/or graphical output. Computing system environment 800 may also include optical scanners (not shown).

Typosquatting detection and notification computing device 801 may operate in a networked environment supporting connections to one or more remote computing devices, such as computing devices 841 and 851. Computing devices 841 and 851 may be personal computing devices or servers that include any or all of the elements described above relative to typosquatting detection and notification computing device 801.

The network connections depicted in FIG. 8 may include Local Area Network (LAN) 825 and Wide Area Network (WAN) 829, as well as other networks. When used in a LAN networking environment, typosquatting detection and notification computing device 801 may be connected to LAN 825 through a network interface or adapter in communications module 809. When used in a WAN networking environment, typosquatting detection and notification computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      receive, from a user computing device, user input associated with a request to access a website via a web browser, the user input including a website address of the website;
      analyze the user input associated with the request to access the website, analyzing the user input including:
         executing a machine learning model, executing the machine learning model including providing, as inputs to the machine learning model, the user input, and outputting, a likelihood of typosquatting in the user input;
         comparing the likelihood of typosquatting to a threshold;
         responsive to determining that the likelihood of typosquatting meets or exceeds the threshold:
            generate a user interface requesting user input confirming accuracy of the user input associated with the request to access the website, wherein the user interface includes three selectable options including a first selectable option to proceed to the website, a second selectable option to not proceed to the website and a third selectable option to request assistance;
            transmit the generated user interface to the user computing device, wherein transmitting the generated user interface to the user computing device causes the user interface to display on a display of the user computing device;
            receive, from the user computing device, selection of one of the three selectable options;
            update, based on the received selection of one of the three selectable options, the machine learning model; and
         responsive to determining that the likelihood is below the threshold, provide the requested access to the website.

2. The computing platform of claim 1, wherein the received selection of one of the selectable options includes selection of the option to not proceed to the website, and wherein the instructions further include:

after updating the machine learning model, receive second user input associated with a second request to access the website via the web browser; and
analyze the second user input associated with a second request to access the website, analyzing the user input including:
executing the updated machine learning model, executing the updated machine learning model including providing, as inputs to the updated machine learning model, the second user input, and outputting an instruction to prevent access to the website.

3. The computing platform of claim 1, wherein the machine learning model is trained using historical web browser data.

4. The computing platform of claim 1, wherein the machine learning model is trained using vendor data including identified safe website and identified potentially malicious websites.

5. The computing platform of claim 1, wherein analyzing the user input associated with the request to access the website is performed in real-time.

6. The computing platform of claim 1, further including instructions that, when executed, cause the computing platform to:
display a visual indicator of potential typosquatting on the user computing device in an address bar of the web browser.

7. The computing platform of claim 1, wherein causing the user interface to display on a display of the user computing device includes causing the user interface to overlay at least 50% of a browser window associated with the web browser.

8. A method, comprising:
receiving, by a computing platform, the computing platform having at least one processor, and memory, and from a user computing device, user input associated with a request to access a website via a web browser, the user input including a website address of the website;
analyzing, by the at least one processor, the user input associated with the request to access the website, analyzing the user input including:
executing, by the at least one processor, a machine learning model, executing the machine learning model including providing, as inputs to the machine learning model, the user input, and outputting, a likelihood of typosquatting in the user input;
comparing, by the at least one processor, the likelihood of typosquatting to a threshold;
responsive to determining that the likelihood of typosquatting meets or exceeds the threshold:
generating, by the at least one processor, a user interface requesting user input confirming accuracy of the user input associated with the request to access the website, wherein the user interface includes three selectable options including a first selectable option to proceed to the website, a second selectable option to not proceed to the website and a third selectable option to request assistance;
transmitting, by the at least one processor, the generated user interface to the user computing device, wherein transmitting the generated user interface to the user computing device causes the user interface to display on a display of the user computing device;
receiving, by the at least one processor and from the user computing device, selection of one of the three selectable options;
updating, by the at least one processor and based on the received selection of one of the three selectable options, the machine learning model; and
responsive to determining that the likelihood is below the threshold, providing, by the at least one processor, the requested access to the website.

9. The method of claim 8, wherein the received selection of one of the selectable options includes selection of the option to not proceed to the website, and the method further including:
after updating the machine learning model, receiving, by the at least one processor, second user input associated with a second request to access the website via the web browser; and
analyzing, by the at least one processor, the second user input associated with a second request to access the website, analyzing the user input including:
executing, by the at least one processor, the updated machine learning model, executing the updated machine learning model including providing, as inputs to the updated machine learning model, the second user input, and outputting an instruction to prevent access to the website.

10. The method of claim 8, wherein the machine learning model is trained using historical web browser data.

11. The method of claim 8, wherein the machine learning model is trained using vendor data including identified safe website and identified potentially malicious websites.

12. The method of claim 8, wherein analyzing the user input associated with the request to access the website is performed in real-time.

13. The method of claim 8, further including:
displaying a visual indicator of potential typosquatting on the user computing device in an address bar of the web browser.

14. The method of claim 8, wherein causing the user interface to display on a display of the user computing device includes causing the user interface to overlay at least 50% of a browser window associated with the web browser.

15. One or more non-transitory computer-readable media storing instructions that, when executed by a computing platform comprising at least one processor, memory, and a communication interface, cause the computing platform to:
receive, from a user computing device, user input associated with a request to access a website via a web browser, the user input including a website address of the website;
analyze the user input associated with the request to access the website, analyzing the user input including:
executing a machine learning model, executing the machine learning model including providing, as inputs to the machine learning model, the user input, and outputting, a likelihood of typosquatting in the user input;
comparing the likelihood of typosquatting to a threshold;
responsive to determining that the likelihood of typosquatting meets or exceeds the threshold:
generate a user interface requesting user input confirming accuracy of the user input associated with the request to access the website, wherein the user interface includes three selectable options including a first selectable option to proceed to the website, a second selectable option to not proceed to the website and a third selectable option to request assistance;

transmit the generated user interface to the user computing device, wherein transmitting the generated user interface to the user computing device causes the user interface to display on a display of the user computing device;

receive, from the user computing device, selection of one of the three selectable options;

update, based on the received selection of one of the three selectable options, the machine learning model; and responsive to determining that the likelihood is below the threshold, provide the requested access to the website.

16. The one or more non-transitory computer-readable media of claim 15, wherein the received selection of one of the selectable options includes selection of the option to not proceed to the website, and wherein the instructions further include:

after updating the machine learning model, receive second user input associated with a second request to access the website via the web browser; and analyze the second user input associated with a second request to access the website, analyzing the user input including:

executing the updated machine learning model, executing the updated machine learning model including providing, as inputs to the updated machine learning model, the second user input, and outputting an instruction to prevent access to the website.

17. The one or more non-transitory computer-readable media of claim 15, wherein the machine learning model is trained using historical web browser data.

18. The one or more non-transitory computer-readable media of claim 15, wherein the machine learning model is trained using vendor data including identified safe website and identified potentially malicious websites.

19. The one or more non-transitory computer-readable media of claim 15, wherein analyzing the user input associated with the request to access the website is performed in real-time.

20. The one or more non-transitory computer-readable media of claim 15, further including instructions that, when executed, cause the computing platform to:

display a visual indicator of potential typosquatting on the user computing device in an address bar of the web browser.

21. The one or more non-transitory computer-readable media of claim 15, wherein causing the user interface to display on a display of the user computing device includes causing the user interface to overlay at least 50% of a browser window associated with the web browser.

\* \* \* \* \*